INVENTORS
Mathew G. Boissevain
BY J. Pierre Schneebeli
Attorney

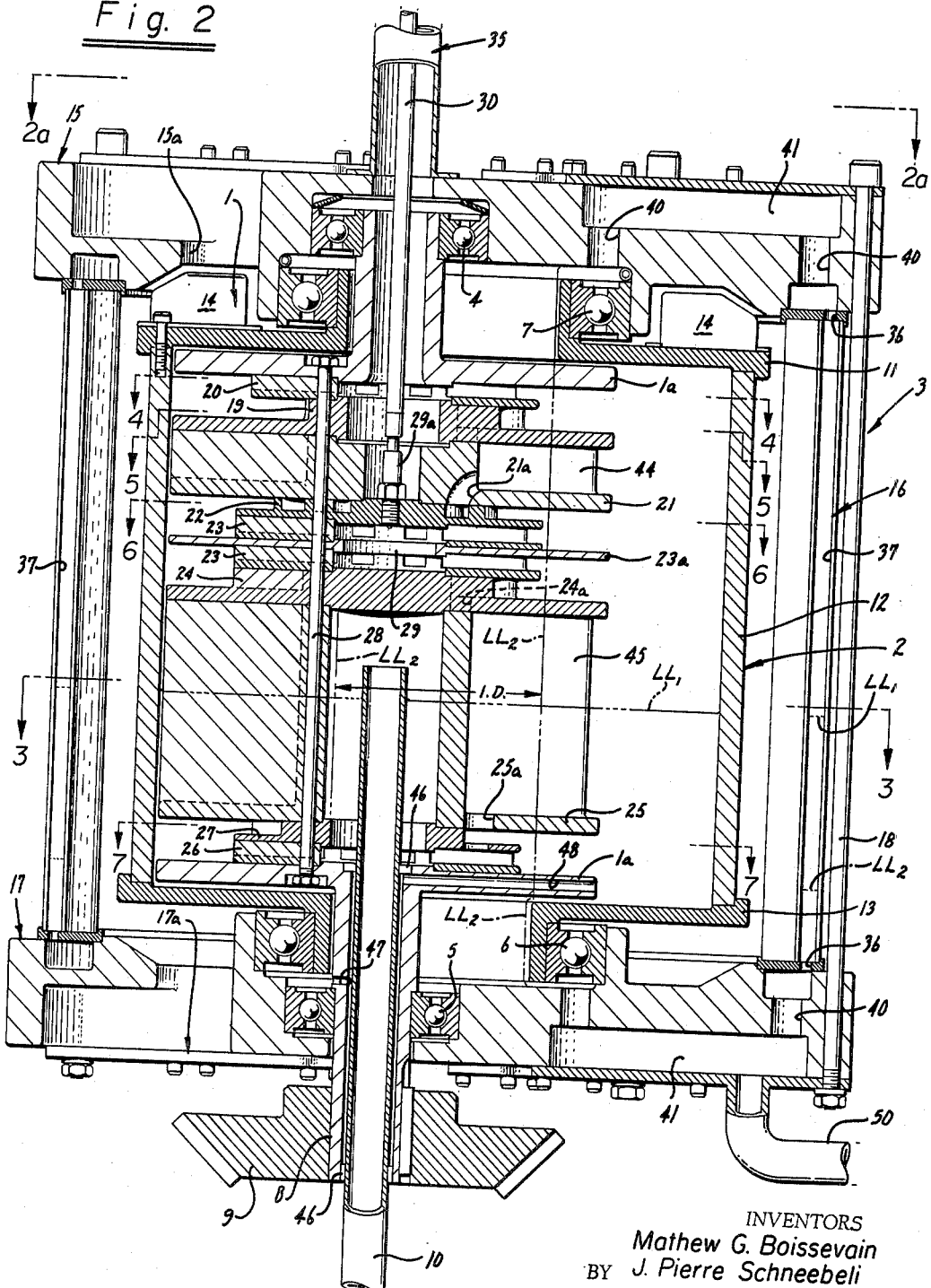

March 15, 1966 M. G. BOISSEVAIN ETAL 3,240,017
LIQUID PISTON INTERNAL COMBUSTION ENGINE
Filed Aug. 5, 1964
7 Sheets-Sheet 3

INVENTORS
Mathew G. Boissevain
BY J. Pierre Schneebeli
Alfons Pfister
Attorney

March 15, 1966    M. G. BOISSEVAIN ETAL    3,240,017
LIQUID PISTON INTERNAL COMBUSTION ENGINE
Filed Aug. 5, 1964    7 Sheets-Sheet 4

INVENTORS
Mathew G. Boissevain
BY J. Pierre Schneebeli
Attorney

March 15, 1966    M. G. BOISSEVAIN ETAL    3,240,017
LIQUID PISTON INTERNAL COMBUSTION ENGINE
Filed Aug. 5, 1964                          7 Sheets-Sheet 6

INVENTORS
Mathew G. Boissevain
BY J. Pierre Schneebeli

Attorney

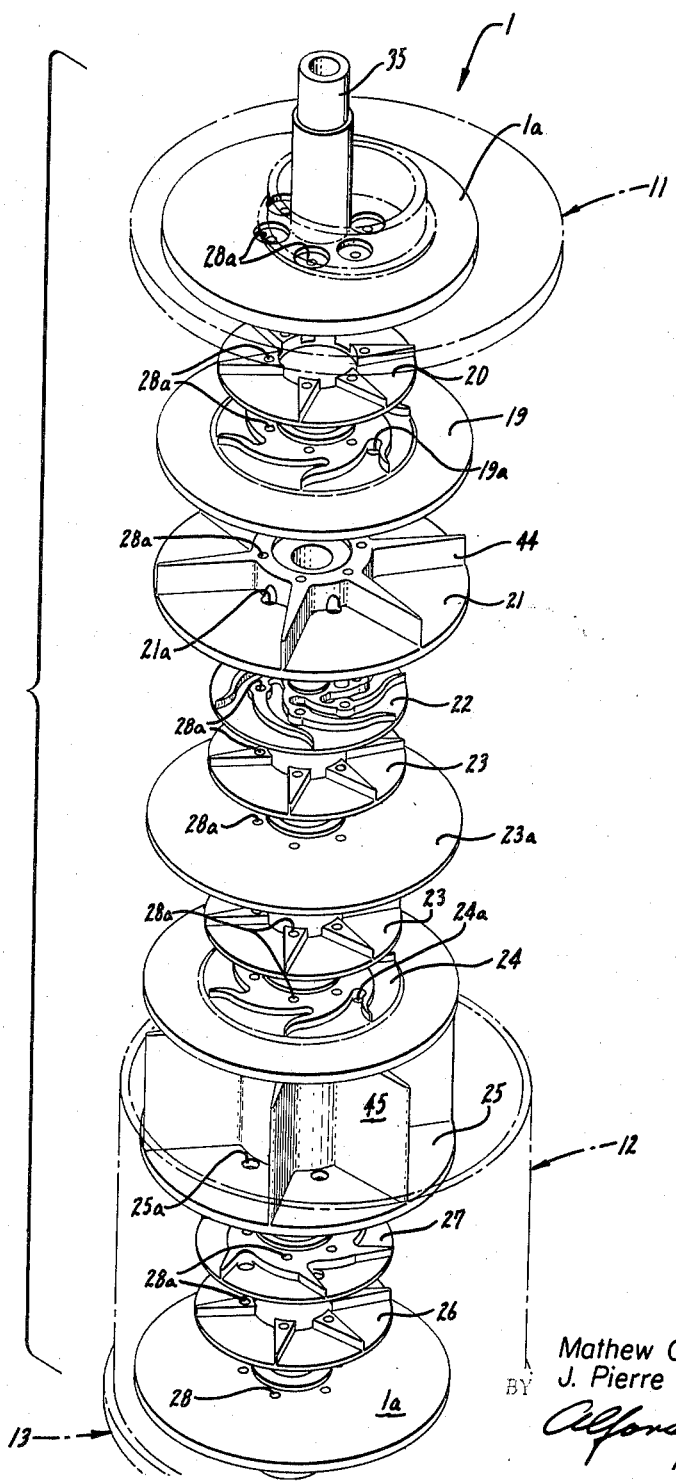

United States Patent Office 3,240,017
Patented Mar. 15, 1966

3,240,017
LIQUID PISTON INTERNAL COMBUSTION
ENGINE
Mathew G. Boissevain, 27181 Sherlock Road, Los Altos Hills, Calif., and Jean-Pierre Schneebelt, 2636 Newhall St., Santa Clara, Calif.
Filed Aug. 5, 1964, Ser. No. 387,711
5 Claims. (Cl. 60—39.61)

Our invention relates to engines of the rotary type and particularly to such an engine utilizing the action of a liquid on a rotor to produce motive power.

Many internal combustion engines of the rotary type have been devised. A few of these have been adapted to untilize a liquid in assisting the development of motive power or torque. All existing engines of this type are subject to a great many objections which have interfered with their successful operation and prevented the commercial success of such engines up to the present time, as more fully brought out below.

One of the principal problems encountered with existing engines is created by the effect of the high temperatures of combustion upon the rotating engine parts. This has made the valving of such engines exceedingly difficult and the use of close clearances, which are essential to efficient operation, virtually impossible. Numerous ingenious cooling systems and devices have been developed, but none of these have been entirely satisfactory. Most existing designs resort to mechanisms or systems which are exceedingly complicated and consequently difficult to maintain and operate. This is especially true of the few engines which have attempted to utilize a liquid to assist in producing the motive power or piston effect in addition to the cooling.

It is therefore a primary object of our invention to provide a rotary internal combustion engine which would be far simpler in construction and more efficient in operation than any now known.

It is another object of our invention to provide a rotary internal combustion engine which utilizes a liquid to assist in effecting motive power and at the same time cools the engine which would be a considerable improvement over any now known.

It is a further and very important object of our invention to provide a valving arrangement for an engine of this type which would utilize liquid sealing and thus avoid mechanical contact between the moving parts.

It is yet another object of our invention to provide an engine of the type described which incorporates a minimum of moving parts and requires a minimum of lubrication.

It is still another object of our invention to provide an engine of the type described which will have superior thermodynamic properties and include the feature of thoroughly scavenging the gases of combustion during each cycle.

It is finally an object of our invention to provide an internal combustion engine of the type described which would combine light weight, reliability, simplicity, low cost, and efficiency for the best utilization of liquid fuel as motive power not now possessed by any other engine known.

These and other objects of our invention will become apparent to those skilled in the art from the detailed description given in the specification, drawings, and claims which follow.

Referring now to the drawings in which like numbers indicate like parts on the respective figures, there are seen the following:

FIG. 2 is a longitudinal section through the body of the engine.

Figure 4:
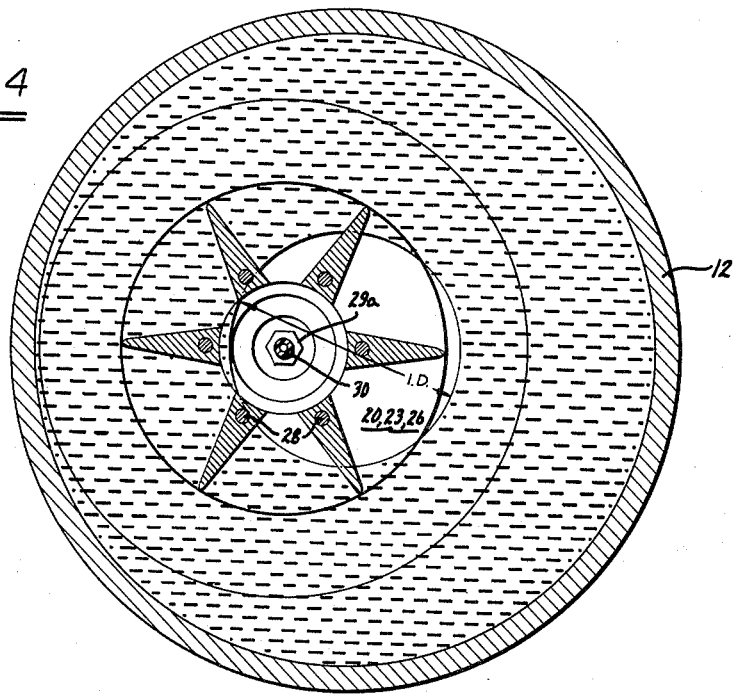
FIGS. 4 through 7 are vertical sections of the valving and porting components of the inner rotor shown in relation to the compressor and motor vanes and forming part of the eccentric inner rotor at the following points.
Figure 5:
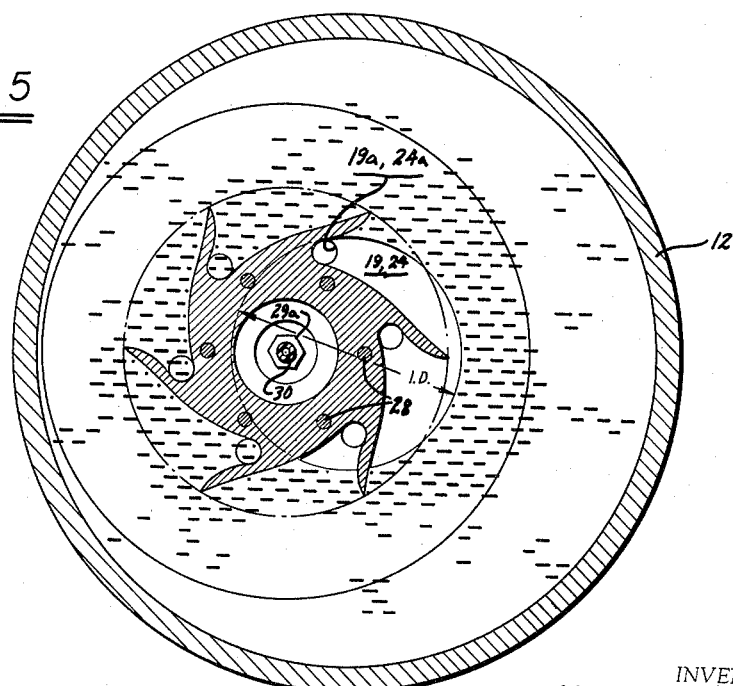
Figure 6:
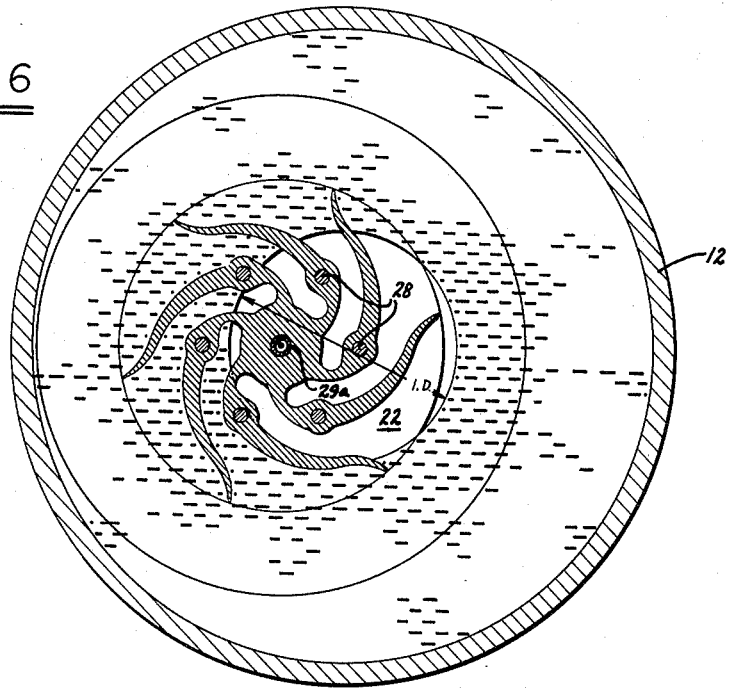
Figure 7:
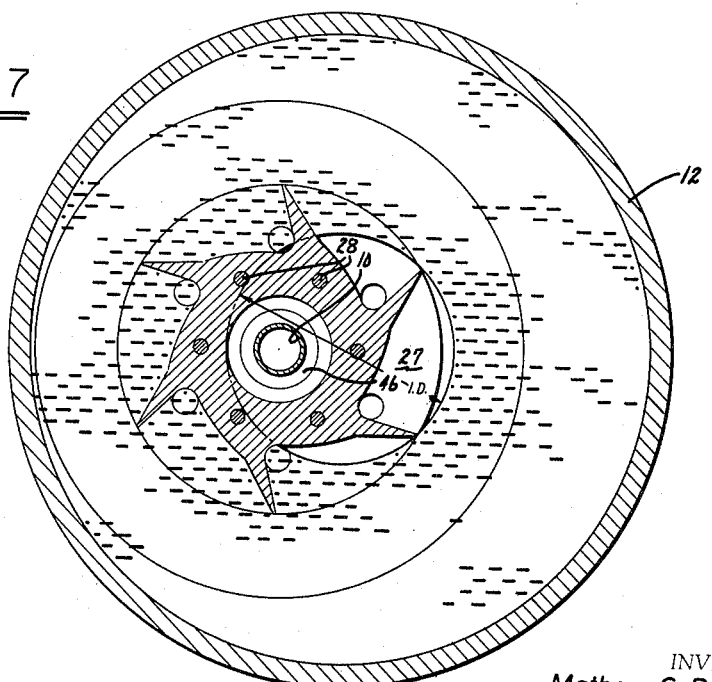

FIG. 4—connecting valves located at section 4—4 of the inner rotor and designated as parts 20, 23, and 26, elsewhere on the drawings;

FIG. 5—compressor and motor intake valves located at section 5—5 of the rotor and designated as parts 19 and 24, elsewhere on the drawings;

FIG. 6—combustion chamber intake valves located at section 6—6 of the rotor and designated as part 22;

FIG. 7—motor exhaust valves located at section 7—7 of the rotor and designated as part 27;

FIG. 8 is an isometric schematic of arrangement of eccentric inner rotor parts separated to show relative positions.

Figure 1:
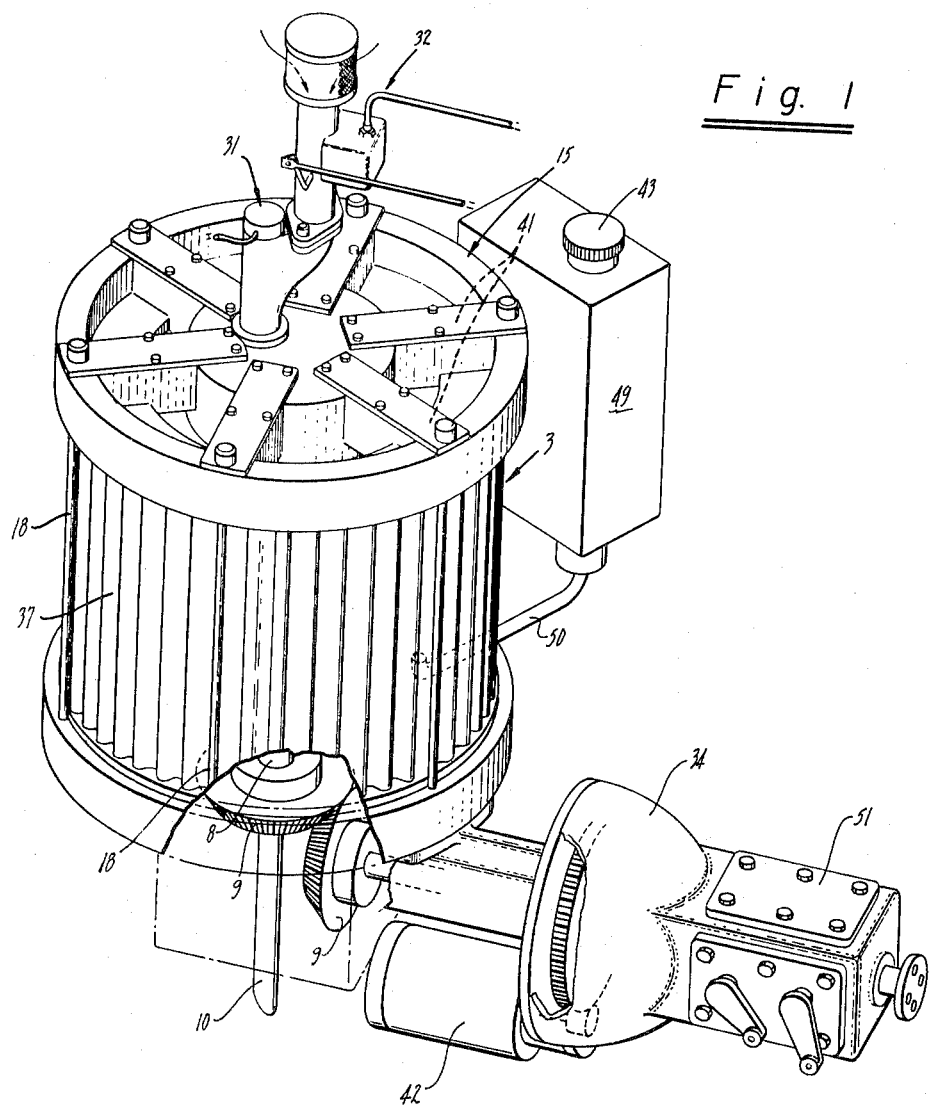
FIG. 1 is an isometric view of the overall assembly, some parts being broken away and some parts shown in section.

Referring now more specifically to FIGS. 1 and 2 and especially to FIG. 2, there is seen an eccentric inner rotor 1, the component parts of which are held together by the inner rotor flanges 1a by means of tie rods 28. The relative positions and functions of these component parts are shown schematically on FIG. 8 and are described more fully below.

There is seen also outer rotor 2 which is positioned inside external housing 3. Bearings 4 and 5 which may be of the anti-friction type serve as the mounting for the eccentric inner rotor 1, while similar bearings 6 and 7 perform the same function for outer rotor 2. Output shaft 8, which forms a part of lower inner rotor nozzle flange 1a, connects through gears 9 and shaft 33 to clutch 34 and final transmission 51. Exhaust pipe 10 is concentrically mounted in output shaft 8, which is seen to be hollow and is separated from the latter by ceramic rings 46.

As integral parts of the outer rotor 2, there is seen the upper flange 11, the tubular body of the rotor 12, and the lower flange 13. These may be fastened together in any suitable manner as indicated. On top of the upper flange 11 there are mounted a series of vanes 14 comprising an air cooling fan.

The outer housing 3 comprises an upper flange 15, a lower flange 17, and a radiator section 16 held together by tie rods 18. These upper and lower flanges have ports or openings 15a and 17a which act as air inlet and outlet ports respectively, and provide heat transfer with the aid of vanes 14.

The two principal parts of the eccentric inner rotor 1 are the compressor rotor 21 and the motor rotor 25. These, together with their connecting valves and ports, will be described more fully below with special reference to FIG. 8.

Figure 2A:
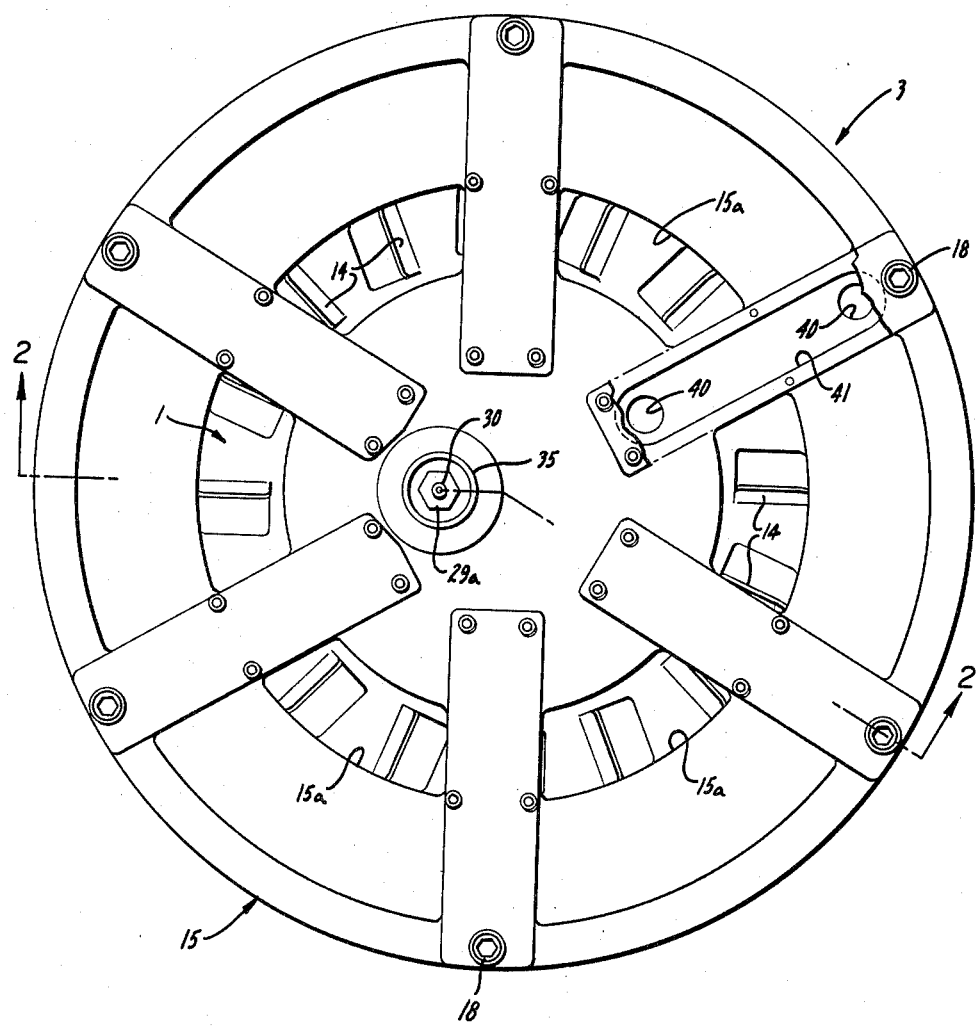
FIG. 2a is a top view at sections 22 of FIG. 2.
Figure 3:
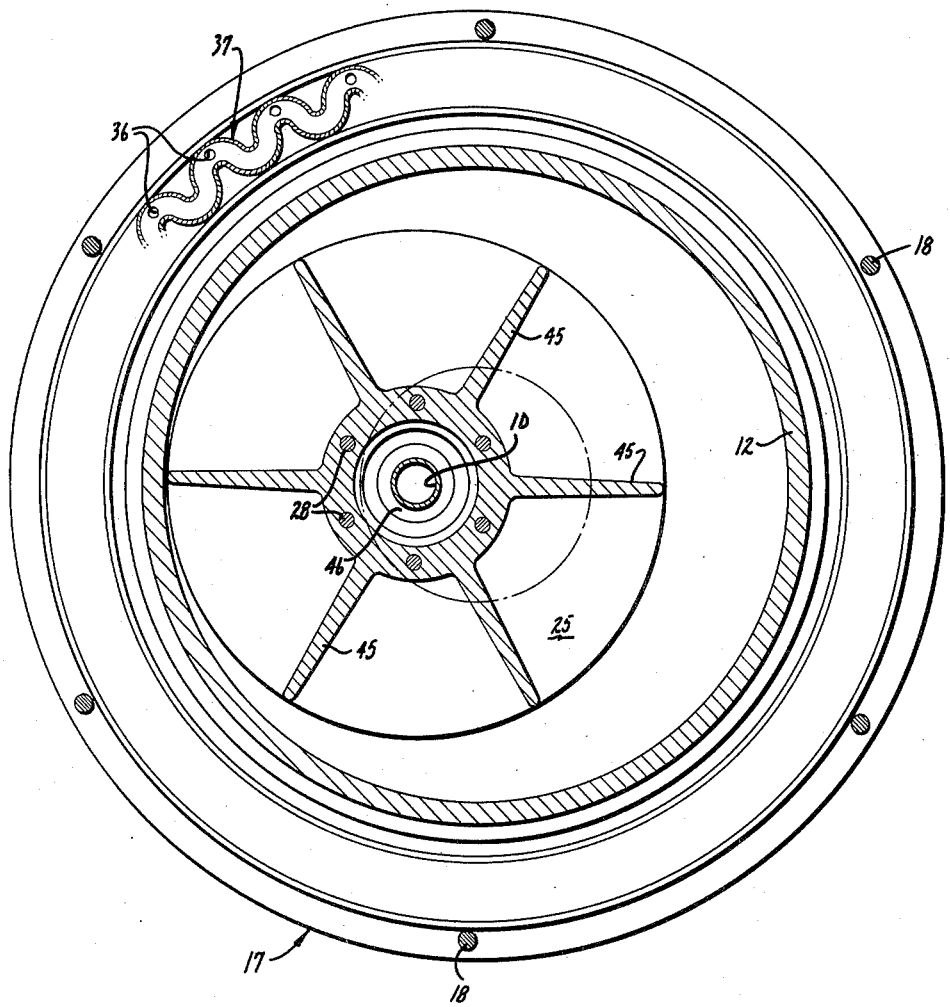
FIG. 3 is a view in vertical axis at section 33.

Best seen also on FIGS. 1 and 2, but shown also on FIGS. 2a and 3, is combustion chamber 29 and electrical glow plug or ignition device 29a. The latter is connected through contact rod 30 to electrical contact box 31 and thence to a convenient source of electricity, such as a conventional storage battery (not shown). The carburetor 32, which may be of a conventional type when conventional fuels such as gasoline are used, communicates with the engine through intake pipe 35 through the valves and ports as described below.

The radiator 16 is comprised of sheet metal walls 37 which have a generally zigzag or corrugated configuration and communicate with the liquid circulating system through holes 36. The latter in turn communicate water passages 40 and 41 located in upper and lower housing flanges 15 and 17. External housing and flanges 38 serve to hold the entire assembly together by means of tie rods 18. Circulation for output shaft bearing cooling liquid is provided by passages 47 and 48. Starting motor 42 completes the general assembly of the body of the engine with the exception of the eccentric inner rotor, a description of which follows.

The eccentric inner rotor 1 and the outer rotor 2 are so constructed and positioned with respect to each other as to utilize a ring of liquid to provide the equivalent of a piston action on compressor rotor 21 and motor rotor 25 as well as a sealing and valving action on the valves and ports associated with the eccentric inner rotor. The same liquid, of course, acts as a cooling medium. In the preferred embodiment of our invention we employ water for this purpose, but it will be clear to those skilled in the art that other suitable liquids may be used. The construction of the remaining components or our engine is better understood when it is seen that the relative action between the eccentric inner rotor and the outer rotor is such as to produce a cylindrical annular ring of water, or other liquid, throughout the length of the housing. The effect of the rotation of the eccentric inner rotor in such a liquid ring is to cause the components of the compressor rotor and motor rotor to enter into and recede from this liquid ring, thereby in turn causing a suction, a compressing, a working action and an exhausting action. The effect of the valves and ports, which are given a special configuration for this purpose, is to enter and recede cyclically from this liquid ring to effect the proper flow of fuel air mixture and combustion gases in and out of the respective rotors in accordance with the required cycle of operation.

For the latter purpose we provide compressor intake valves 19 and motor intake valves 24 having portholes 19a and 24a respectively which are shown diagrammatically on FIG. 5. We provide also compressor connecting valves 20, combustion chamber and motor connecting valves 23, and exhaust connecting valves 26, all of which have the same configuration and are shown diagrammatically in FIG. 4. We provide also combustion chamber intake valves 22 shown on FIG. 6 and motor exhaust valves 27 shown on FIG. 7. Compressor vanes 44 and motor vanes 45, which appear on FIGS. 3 through 7, are ordinary straight vanes paddle wheel type of construction. Compressor rotor 21 is equipped with outlet ports 21a and motor rotor 25 is equipped with outlet ports 25a. FIGS. 4 through 7 inclusive show diagrammatically the relative position of these various components, while FIG. 8 shows their schematic relative arrangement and position isometrically. This will be clear to those skilled in the art from a description of the operation of our engine which follows.

Most of the parts of our engine are fabricated from aluminum or aluminum alloys by the die casting process.

The members of the inner rotor such as parts No. 39, 20, 19, 21, 22, 23, 23a, 24, 25, 27, 26 and 8 are "one side castings."

These castings are designed to permit a low cost manufacturing because of the simplicity of the mold.

The parts of the inner rotor are held together in the final asembly by six tie rods 28 and then dynamically balanced.

Once the inner rotor is assembled, it is set in the middle of the tubular body 12. On each end of body 12 flanges 11 and 13 are then mounted and bolted to the body. This second assembly has enclosed the inner rotor inside the outer rotor. Each rotor now gets one ball bearing on each end.

Finally, the two bottom ball bearings are mounted inside flange 17.

The radiator 16 is fitted on flange 17 and flange 15 is now added to this assembly.

Once the flanges of the housing are correctly aligned with the bearings of both rotors and the radiator, the end flanges are mounted and the tie rods 18 (6) are tightened to complete the assembly.

*Operation*

In this description we disclose our engine operating on a constant pressure cycle although it is not necessarily limited to this. We also disclose here an operation wherein both the eccentric inner rotor 1 and the outer rotor 2 rotate while the engine is producing power, although our engine will operate if the outer rotor 2 is held stationary, which it may be desirable to do under some conditions.

To begin with, the liquid is introduced into the external housing 3 through liquid filling spout 43 and gravity storage tank 49 and filling line 50 until approximately one-half of the motor rotor 25 is submerged, the liquid level then standing at $LL_1$ in FIG. 2. In practice our gravity feed tank 49 may be equipped with a controller (not shown) which automatically maintains the liquid at the desired level. It should be noted that the exhaust pipe 10 extends an appreciable distance above this level inside the inner rotor to prevent loss of liquid to the exhaust when the engine is stopped. The starting motor 42 is then energized and rotation imparted through the transmission described previously to output shaft 8. This is continued until this shaft has attained a velocity of anywhere from one hundred to a thousand r.p.m. This, of course, causes the liquid to rotate also which in turn imparts rotation to the free wheeling outer rotor 2. The effect of this combined centrifugal force on the water is to cause it to rise vertically inside the outer rotor until it forms a hollow cylinder, having an inside diameter indictaed as I.D. on the figures. The liquid level in the radiator will correspondingly drop down to a lower level indicated as $LL_2$. It should be noted that this inside diameter, I.D., is somewhat smaller than the opening in upper flange 11. This permits liquid to flow upwards through upper openings 40 and passageway 41 and down through upper opening 36 and through the radiator 16, thus providing a cooling circuit since liquid in the radiator at level $LL_2$ is under sufficient head to cause it to flow down through lower opening 36 in lower flange 17 and through the corresponding lower openings 40 and 41 in the same flange and back to the interior of the outer rotor. Part of this same circulating system is utilized to cool the exhaust pipe 10 by permitting flow through openings 47 and 48. A liquid supply to the engine is adjusted by means of the aforementioned level control in tank 43 (not shown) so that adequate circulation is maintained at all times. In the event that insufficient liquid is supplied to the engine, the I.D. will increase to the point where the sealing effect will be destroyed and the engine will stall. If excessive liquid is supplied this will be drowned by stopping the effect of the eccentricity of the liquid ring on the inner rotor.

The piston effect obtained in our engine is the result of the eccentricity of one of the rotors relative to the other and the action of the liquid therebetween. At each turn the vanes of the inner rotor dip into the liquid ring, which results in compression of the gas trapped between those vanes. By the same token, when the vanes go out of the water, the gas trapped between them expands, creating suction if it is connected with the ambient atmosphere.

This suction will indeed occur after all the gas that was trapped between two vanes is evacuated, and after the vanes have reached their maximum dipping position.

During the maximum dipping position, the gas trapped between the vanes is evacuated. As the vanes continue their rotation and get out of the liquid, a vacuum will be created in the before described space. If this vacuum chamber is suddenly connected with the carburetor of the motor, fresh gas will be admitted between these two specific vanes.

To make this sudden connection possible, a set of valves is necessary (as on a standard piston type internal combustion engine).

In our engine, the valves are part of the inner eccentric rotor. The valves themselves are fixed in relation to the before described vanes, and the liquid moving back and forth will be opening and closing the valves at the correct moment for a proper timing.

In FIG. 2 we see that the gas passage includes parts 20 and 19 in respective sections 4—4 (FIG. 4) and 5—5 (FIG. 5).

To reach the correct space between two specific vanes of the compressor, the gas must pass first between the vanes of valve 20, over the outside diameter of the body of valve 20 and through the spider-like passages of valve 19 and ports 19a.

The correct timing is achieved as follows: The gas in valve 20 (see FIG. 4) is admitted in the center of the valve and can go through any of the six passages, limited by the six triangular members shown in section. But the liquid line inner diameter of liquid ring I.D. blocks five of those six passages and leaves only the one which is at the right of FIG. 4. This passage ends on a quarter-moon-shaped opening between the outside diameter of the valve body and the inner diameter of the liquid ring. This opening permits the gas to go up or down past the outside diameter of the valve body. But the gas cannot go because the large diameter of the flange 1a blocks the gas opening.

But looking downward from the valve 20, the picture is different. Indeed, the gas can pass the outside diameter of this valve body 20 and reach valve 19.

The gas cannot go further down because of the large diameter of this valve 19 again blocks the way.

The gas thus can only stay at the level of valve 19 and penetrate inside valve 19 through the passages 19a between the spider-shaped vanes (seen in section in FIG. 5).

The remarkable thing about this process is the fact that the specific valve passage we just described happens to communicate with the space between two vanes 44 of the compressor 21 which are, at this moment, getting out of the liquid and thus creating a vacuum.

In other words, the spider shape of vane 19 has created the correct timing for this specific set of vanes.

It is to be noted that the shape of the valves 19 plus the outside diameter of this valve permit the gas to get in when required, and only when required.

After the gas has been admitted into the specific vane space, the liquid closes the specific valve 19. The gas is going to be compressed in the next half revolution of the inner rotor 1 by the action of the liquid on the space between vanes 44.

At the end of the compression cycle of this specific vane space, another set of valves opens to allow the gas to be forced into the combustion chamber 29.

This second set of valves is called the compressor exhaust valves or combustion chamber inlet valves 22. It operates in a similar fashion to the compressor intake valves previously described, but the spider shape is reversed to create the correct timing.

Looking at FIG. 6 (section 6—6), we can visualize the gas trapped between the vanes situated in the lower left part of FIG. 6. This has been compressed by the liquid as before described. Ports 21a in the large diameter flange of compressor rotor 21 make the space between these specific vanes communicate with one passage between two spider-shaped vanes shown in section in FIG. 6 of valve body 22.

The curvature of the vanes of valve 22 is such that the gas trapped between the vanes of rotor 21 before mentioned, can reach the same quarter-moon shaped passage between the outside diameter of valve flange 22 and the inside diameter of the liquid ring I.D.

This quarter-moon-shape seems smaller in FIG. 6 than it was in FIG. 5. This is only theoretical. In practice, the pressure exerted by the gas escaping from the set of vanes before mentioned, pushes the water ring inside diameter back slightly, thus creating a larger quarter-moon-shaped opening.

Through this opening the gas can now escape downward. The gas cannot go upward because of the large diameter of the flange of compressor 21, and the gas cannot go far downward because again, the large diameter of flange 23a blocks the quarter-moon-shaped opening by being at all times immersed in the liquid ring. Thus the gas escaping from valve 22 can only penetrate valve 23 and reach the combustion chamber 29.

In the combustion chamber, the glow plug 29a ignites the gas, which then burns. This combustion creates heat, which in turn forces the gas to expand. This expansion makes the gas search for lower pressure outlets. This outlet can be found in the lower part of the eccentric inner rotor 1, namely the motor 25.

The principle of the valves of the motor stage is identical to the one of the compressor stage.

To understand fully the motor cycle, it suffices to go through the same type of reasoning made for the compressor cycle. The only difference is the fact that the gas does not absorb power in a compression action, as in the compressor, but creates power by expanding between two vanes before being released through the exhaust to the atmosphere.

Thus valve 24 has the same construction and performs the same relative function as valve 19. The motor vanes 45 are the counterpart of compressor vanes 44 but are longer to provide larger volume for expansion and work. Motor intake valve portholes 24a are analogous to compressor intake valve portholes 19a and motor exhaust portholes 25a are analogous to compressor discharge portholes 21a, etc., etc.

It will now be seen that the engine of our invention utilizes a novel arrangement of rotors, valves, and sealing devices in combination with a liquid ring to effect three simultaneous functions, namely, to provide a piston effect to compress the gases and to perform useful work, to effect suitable valving operations to make the foregoing cyclically possible, and to effect a novel and highly efficient cooling system. While our engine utilizes a piston effffect in actual operation it approaches a turbine in smoothness of running.

Many other advantages of the engine of our invention will now be apparent to those skilled in the art and while we have disclosed herein a preferred embodiment of our invention, many alterations and modifications thereof will also now be evident to those skilled in the art without departing from our basic disclosure herein. We do not therefore limit ourselves to this particular embodiment, except as we do so in the claims which follow.

We claim:

1. A rotary internal combustion engine utilizing liquid action comprising:
   a first outer rotor of generally hollow cylindrical construction;
   a second inner rotor of generally cylindrical configuration;
   said second rotor being rotatably mounted within said first rotor so that its axis is eccentric to the axis of said first rotor;
   means for introducing and circulating a liquid in said first rotor;
   means for cooling said liquid;
   means for initially rotating said second rotor so that rotation is imparted to said liquid and through said liquid to said first rotor;
   thereby producing a hollow cylindrical ring of liquid against the interior of said first rotor and concentric thereto;
   a compressor member comprising a plurality of radial vanes positioned upon a circular disc fixedly mounted on said second rotor and concentric to the axis thereof;

a motor member comprising a plurality of radial vanes positioned upon a circular disc fixedly mounted on said second rotor, concentric to the axis thereof and in axially spaced relation to said compressor member;

a combustion chamber positioned within said second rotor between said compressor and said motor;

means for introducing a combustible vapor into the interior of said first rotor;

means for igniting said combustible capor positioned within said combustion chamber;

means for exhausting gases of combustion from said first rotor;

intake valves of generally flat, star-shaped configuration concentrically mounted in a fixed position on said second rotor between said fuel introducing means and said compressor member;

exhaust valves of generally flat, star-shaper configuration concentrically mounted in a fixed position on said second rotor between said compressor member and said combustion chamber;

intake valves of generally flat, star-shaped configuration concentrically mounted in a fixed position on said second rotor between said combustion chamber and said motor member;

exhaust valves of generally flat, star-shaped configuration concentrically mounted in a fixed position on said second rotor between said motor member and said gas exhausting means;

said valves, said compressor vanes and said motor vanes being arranged to successively become immersed into and to recede from said cylindrical ring of liquid during the rotation of said rotors thereby producing cyclical periods of suction and compression in the spaces between said comperssor vanes and the spaces between said motor vanes;

said valve, said compressor vanes and said motor vanes being further arranged relative to each other and to said cylindrical ring of liquid that cyclical flow of said combustible vapor is caused through said compressor and into said combustion chamber and cyclical flow of gases of combustion is caused through said motor and said exhaust means thereby producing further continued rotation of said second rotor and the generation of useful power therefrom.

2. A rotary internal combustion engine utilizing liquid action comprising:

a first outer rotor of generally hollow cylindrical construction;

a second inner rotor of generally cylindrical configuration;

said second rotor being rotatably mounted within said first rotor so that its axis is eccentric to the axis of said first rotor;

means for introducing and circulating a liquid in said first rotor;

means for cooling said liquid;

means for initially rotating said second rotor so that rotation is imparted to said liquid and through said liquid to said first rotor;

thereby producing a hollow cylindrical ring of liquid against the interior of said first rotor and concentric thereto;

means for introducing a combustible vapor into the interior of said first rotor;

means for exhausting gases of combustion from said first rotor;

said second rotor comprising;

a compressor member characterized by a plurality of radial vanes mounted upon a circular flange fixedly positioned on the axis of said rotor and concentric thereto;

a motor member comprising a plurality of radial vanes mounted upon a circular flange fixedly positioned on the axis of said rotor and concentric thereto, in axial relation to said compressor member and having portholes through said flange between said vanes;

a combustion chamber positioned between said compressor member and said motor member;

means positioned within said combustion chamber for igniting said combustible vapor;

compressor intake valves characterized by a plurality of radial prongs mounted on a disc having a diameter less than the inside diameter of said ring of liquid, and positioned close to said vapor introducing means and communicating with said compressor;

compressor discharge valves characterized by a plurality of radial prongs mounted on a circular disc and having an outside diameter greater than the diameter of said ring of liquid, having portholes through said flange between said prongs communicating with said compressor and said combustion chamber;

motor intake valves characterized by a plurality of radial prongs mounted on a disc and having a diameter less than the inside diameter of said ring of liquid, and positioned close to said vapor introducing means and communicating with said motor;

motor discharge valves characterized by a plurality of radial prongs mounted on a circular disc having an outside diameter greater than the diameter of said ring of liquid, having portholes through said flange between said prongs communicating with said motor and said exhaust means.

3. A rotary internal combustion engine utilizing liquid piston action comprising:

a first outer rotor of generally hollow cylindrical construction;

a cylindrical hollow ring of liquid within said first rotor;

a second inner rotor of generally cylindrical configuration rotatably mounted within said first rotor so that its axis is eccentric to the axis of said first rotor, and characterized by generally circular disc-shaped components having their radical faces in close contact, arranged axially and concentrically with respect to the axis in a predetermined order with respect to each other as follows:

(a) compressor connecting valves characterized by a plurality of straight radial spokes mounted on a disc having a diameter less than the inside diameter of said ring of liquid;

(b) compressor intake valves characterized by a plurality of tangential spokes curved towards the direction of rotation and mounted on a circular disc having an outside diameter greater than the diameter of said ring of liquid, and portholes through said disc between said spokes communicating with;

(c) a compressor member characterized by a plurality of radial vanes mounted upon a circular flange, said flange having a diameter greater than the diameter of said ring of liquid and portholes through said flange communicating with;

(d) combustion chamber intake valves characterized by a plurality of tangential spokes curved backward from the direction of rotation and mounted on a circular disc having an outside diameter greater than the diameter of said ring of liquid and communicating with;

(e) a combustion chamber and means of ignition positioned therein;

(f) a circular disc having a diameter greater than the diameter of said ring of liquid;

(g) motor intake valves characterized by a plurality of tangential spokes curved towards the direction of rotation and mounted on a circular disc having an outside diameter greater than the diameter of said ring of liquid and portholes through said disc communicating with;
(h) a motor member characterized by a plurality of radial vanes mounted upon a circular flange, said flange having a diameter greater than the diameter of said ring of liquid and portholes through said flange communicating with;
(i) motor exhaust valves characterized by a plurality of tangential spokes curved backward from the direction of rotation and mounted on a circular disc having an outside diameter less than the diameter of said ring of liquid;
means for introducing combustible vapor to said compressor connecting valves;
means for exhausting gases of combustion from said motor exhaust valves and from said rotors;
means for cooling said liquid.

4. An apparatus for compressing vapors which utilizes a cylindrical rotor having straight radial blades, mounted in a housing and a concentric liquid seal partially surrounding said eccentric rotor so that rotation of said rotor produces successive compression and expansion of vapor located in the spaces between said rotor blades and said liquid seal, the improved valving means comprising:
a first circular disc having one face concentrically mounted against a first face of said rotor;
radial spokes fixedly positioned upon the opposite face of said first disc;
said spokes being curved forward towards the direction of rotation of said rotor and having a radial length less than the radius of said first disc;
a second circular disc having one face concentrically mounted against a second face of said rotor;
radial spokes fixedly positioned upon the opposite face of said second disc;
said spokes being curved backward from the direction of rotation of said rotor and having a radial length less than the radius of said second disc;
portholes through said discs between each pair of said spokes and close to the inner ends thereof connecting with said spaces between said blades;
the outer periphery of said discs being continuously submerged in said liquid seal during the rotation of said rotor;
said spokes being successively submerged in and emerged from said liquid seal during the rotation of said rotor;
whereby vapors may be successively admitted to said spaces between said rotor blades and said liquid seal and successively exhausted therefrom.

5. A rotary internal combustion engine comprising:
a first hollow cylindrical rotor;
a second cylindrical rotor eccentrically positioned and rotatably mounted within said first rotor;
a liquid interposed between said rotors so that rotation of said rotors effects a hydraulic seal between a portion of the inner circumference of said first rotor and a portion of the outer circumference of said second rotor thereby producing an open space therebetween;
means for admitting combustible vapor to said first rotor at a first end of said second rotor;
means for igniting said vapor;
means for exhausting gases of combustion from said first rotor at a second end of said second rotor;
a first valve means comprising a plurality of spokes radially mounted on a disc around the axis of and between said first end of said second rotor and said vapor admitting means;
a second valve means comprising a plurality of spokes radially mounted on a disc around the axis of and between said second end of said second rotor and said vapor exhausting means;
said first valve means and said second valve means being so disposed and arranged with respect to said rotors, to said liquid and to each other that rotation of said rotors and said valve means in said liquid produces an intermittent hydraulic seal across the ends of said spokes, thereby cyclically admitting combustible vapor to said open space between said rotors and exhausting gases of combustiion therefrom;
a cylindrical housing comprising two concentric corrugated shells with a space therebetween surrounding said hollow cylindrical rotor;
means for maintaining a predetermined liquid level in said space between said shells;
means for connecting said space to the interior of said hollow cylindrical rotor whereby circulation of liquid therebetween is effected;
means for circulating air between said cylindrical rotor and said cylindrical housing.

References Cited by the Examiner

UNITED STATES PATENTS 2,136,528 11/1938 Stelzer _____ 230—79
2,937,499 5/1960 Klemt _____ 60—39.61

MARK NEWMAN, *Primary Examiner.*

RALPH D. BLAKESLEE, *Examiner.*